April 3, 1962   L. E. LEE   3,027,907
COMBINATION VALVE
Original Filed March 29, 1957

INVENTOR
LUTHER E. LEE

BY Q. Baxter Warner
Claude Funkhouser
ATTORNEYS

United States Patent Office 3,027,907
Patented Apr. 3, 1962

3,027,907
COMBINATION VALVE
Luther E. Lee, 6625 Eastern Ave., Takoma Park, Md.
Original application Mar. 29, 1957, Ser. No. 649,580, now Patent No. 2,897,790, dated Aug. 4, 1959. Divided and this application Mar. 26, 1959, Ser. No. 802,266
3 Claims. (Cl. 137—107)
(Granted under Title 35, U.S. Code (1952), sec. 266)

This invention described herein may be manufactured and used by or for the Government of the United States of America for governmental purposes without the payment of any royalties thereon or therefor.

The instant invention is a division of patent application Serial No. 649,580, filed by Luther E. Lee on March 29, 1957, now Patent No. 2,897,790 for Control System.

The present invention relates to a valve and more particularly to a new and improved combination check and exhaust valve suitable for use with a fluid control system such, for example, as the system disclosed and claimed in the afore-mentioned application Serial No. 649,580.

More specifically the invention contemplates the provision of a fluid controlled valve having new and improved means for bypassing fluid under pressure flowing in one direction and for exhausting the pressure when the fluid under pressure flows in a reverse direction. Moreover, the invention provides a spring biased valve body normally maintained in a closed position and sealed to the walls of the valve casing by a flexible disc formed integrally with the body, the disc being constructed and arranged to be distorted and unsealed from the walls of the casing in response to a predetermined pressure applied thereto in one direction and for effectively engaging and sealing the walls of the casing in response to pressure applied thereto in a reverse direction, whereupon the pressure is quickly exhausted to atmosphere.

An object of the present invention is to provide a new and improved fluid actuated valve.

Another object of the invention resides in the provision of a novel valve capable of instantaneous response to fluid under pressure flowing either in one direction or a reverse direction.

A further object of the invention is to provide a novel valve for admitting fluid pressure into various fluid actuated devices and for rapidly exhausting the residual pressure therefrom.

A still further object of the invention is the provision of a normally sealed valve element unsealed and sealed in response to fluid pressure applied to opposite surfaces of a flexible element forming a part of the valve element.

Other objects and many of the attendant advantages of this invention will be readily appreciated as the same becomes better understood by reference to the following detailed description when considered in connection with the accompanying drawings wherein.

Figure 1:
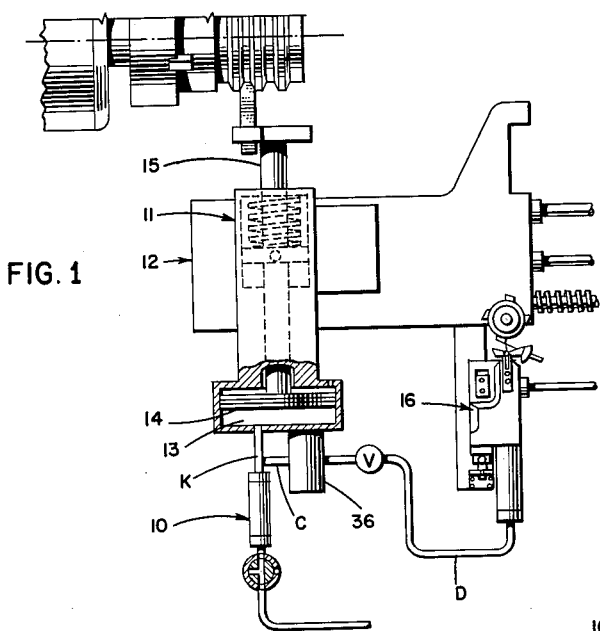
FIG. 1 is a fragmentary view partially in elevation and partially in section of an automatic step advancing toolholder illustrating the valve of the present invention in fluid communication therewith.
Figure 6:
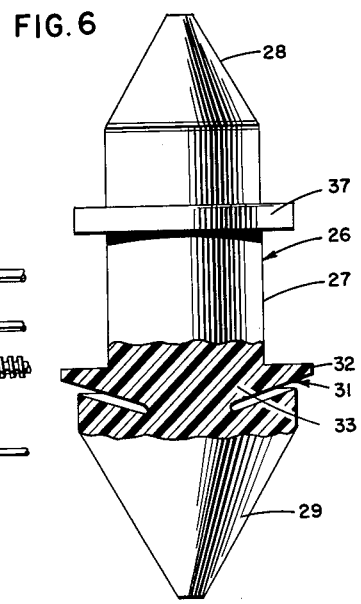
FIG. 6 is an enlarged elevational view, partially in section, of the movable valve member.

Referring to the drawings, and more particularly to FIG. 1, the present invention generally indicated by the numeral 10 is illustrated in connection with a pressure operated automatic step advancing toolholder 11 such, for example as disclosed in my copending parent application Serial No. 649,580. The toolholder 11, which is supported on a conventional lathe carriage 12, includes a piston chamber 13, a piston 14 disposed within chamber 13 and a toolholding ram 15 movable into the workpiece as fluid pressure enters chamber 13 and displaces piston 14. The valve 10 is also in fluid communication with a pressure operated thread counter valve 16 such as disclosed in the afore-mentioned application Serial No. 649,580.

Figure 4:
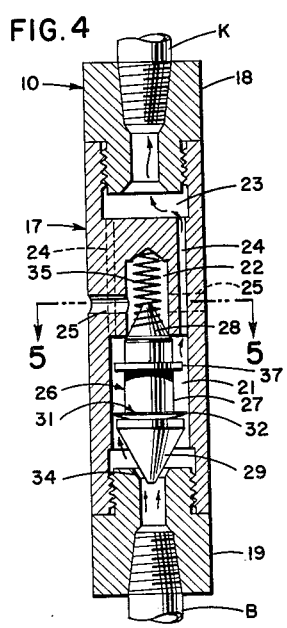
FIG. 4 is a view similar to FIG. 3, with the valve in an unsealed open position.
Figure 3:
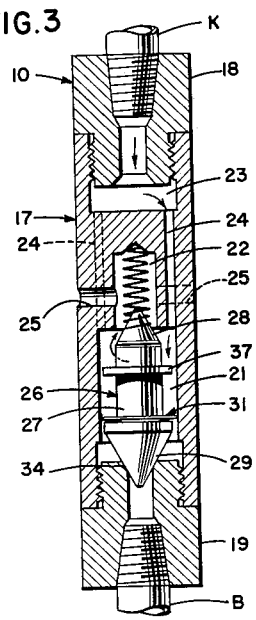
FIG. 3 is a sectional view taken substantially on the line 3—3 of FIG. 2, with the valve in a normally sealed closed position.
Figure 2:
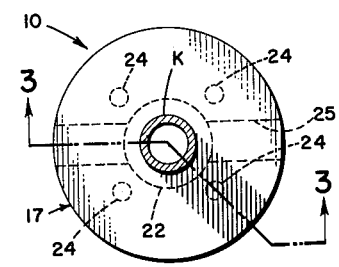
FIG. 2 is a plan view of the valve of FIG. 1.
Figure 5:
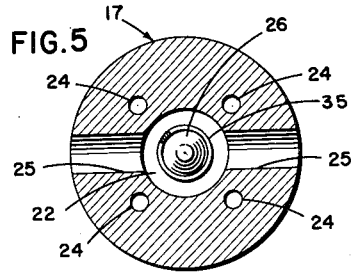
FIG. 5 is a transverse sectional view taken substantially on the line 5—5 of FIG. 3.

The valve 10 of the present invention as shown in more detail in FIGS. 3 through 5 is constructed and arranged to supply fluid pressure to toolholder 11 and thread counter valve 16 and to quickly exhaust residual fluid pressure therefrom when their operating cycle is completed.

The valve 10 comprises a casing 17 having a nipple 18 threaded in one end and a nipple 19 threaded in the other end thereof. The casing 17 is provided with chamber 21 adjacent the nipple 19, the chamber 21 terminating in a chamber or bore 22 of reduced diameter with respect to the diameter of chamber 21. The casing 17 is further provided with a chamber 23 adjacent nipple 18, chamber 23 being in communication with chamber 21 such, for example, as by a plurality of bores or ports 24, the casing being provided also with a plurality of vent or exhaust ports 25 in communication with chamber 22 and with the atmosphere, as best shown on FIGS. 3, 4 and 5.

A combination check and exhaust valve member generally indicated by the reference character 26 and composed of any pliable material suitable for the purpose such, for example, as "Teflon," the valve being movably arranged in chamber 21, and comprising a cylindrical body 27 having conical portions 28 and 29 at the terminal ends thereof. The body 27 has formed thereon an annular skirt 31, the skirt being provided with relatively thin annular peripheral portion 32 forming a part of a relatively thick convex portion 33 integrally formed with the body 27. The body 27 is further provided with a guide flange 37 disposed substantially midway between the skirt 31 and the conical end 28 of the body 27, for guiding the valve within chamber 21 during movement thereof.

When the valve 26 is in an initial position as shown in FIG. 3, the conical portion 29 is maintained in sealed engagement with a seat 34 formed in nipple 19 by a spring 35 having one end in engagement with conical portion 28 and the other end in engagement with the bottom wall of chamber or recess 22. Furthermore, in the aforesaid position of the valve the thin peripheral portion 32 of the skirt 31 is in sealing engagement with the cylindrical wall forming chamber 21.

When fluid pressure enters chamber 21 in one direction as indicated by the arrows, FIG. 4, from a suitable source such, for example, as an air compressor by way of conduit B the valve 26 moves to a position as shown in FIG. 4, the conical portion 28 of the valve is in sealing engagement with chamber 22 sealing off exhaust port 25, conical portion 29 being unsealed from seat 34 and the thin peripheral portion 32 of skirt 31 being flexed or distorted in response to the pressure impinging thereagainst an amount sufficient to unseal the skirt from the cylindrical wall forming chamber 21. Thus, the pressure in chamber 21 is ported into chamber 23 by way of ports 24 in casing 17 and into chamber 13 of toolholder 11 by way of conduit K to actuate piston 14, the pressure also being ported into thread counter valve 16 by way of conduit C, pressure responsive valve 36 and conduit D.

When residual pressure from chamber 13 and counter valve 16 enters chamber 23 in a reverse direction, as indicated by the arrows, FIG. 3, by way of the aforesaid conduits and pressure responsive valve the combined spring force and fluid pressure moves and maintains the conical member 29 of body 27 in sealing engagement with seat 34, the aforesaid pressure also maintaining the peripheral portion 32 of the skirt 31 in sealing engagement with the wall forming chamber 21 and the conical member 28 of body 27 unsealed from chamber 22. Thus, since the conical member 29 and portion 32 provide a double seal which seals off conduit B, the residual pressure is quickly exhausted by way of chamber 22 and vent or exhaust ports 25.

From the foregoing it will be apparent that a new and improved combination check and exhaust valve has been devised wherein a thin skirt on valve mmeber is sufficiently pliable to be actuated in response to fluid under pressure flowing in one direction and which will effectively seal the cylindrical walls of the valve casing in response to fluid flowing under pressure in a reverse direction thereby to cause the pressure to be quickly exhausted to atmosphere pressure. Moreover, if desired, the valve of the present invention may be utilized as a one way check valve by plugging the vents 25 in any conventional manner. In such an arrangement the conical portion 29 and skirt portion 32 on valve body 27 would allow passage of fluid under pressure in one direction and prevent passage of the pressurized fluid in a reverse direction by reason of the double and positive sealing connection provided by member 29 and seat 34, peripheral portion 32 and the wall forming the cylindrical chamber 21.

Obviously many modifications and variations of the present invention are possible in the light of the above teachings. It is therefore to be understood that within the scope of the appended claims the invention may be practiced otherwise than as specifically described.

What is claimed is:

1. A valve assembly for passing and exhausting fluid pressure comprising a casing having a pair of chambers therein, a unitary valve member composed of pliable material and movably disposed in one of said chambers and having a cylindrical body portion, a first conical seat formed in said casing, a first conical element at one end of said body portion and normally in sealing engagement with said first conical seat and movable out of engagement with the seat in response to fluid pressure entering the casing at the end thereof and in one direction, a spring disposed within the casing in engagement with said body portion and the casing for normally maintaining the first conical element in sealing engagement with the first conical seat, an annular flexible skirt having a thin peripheral edge thereon of a greater diameter than said body portion and normally in sealing engagement with said casing, said skirt forming a part of a thick convex portion integrally formed with said body portion thereby to increase the strength of the skirt at the flexing point thereof, port means in said casing in communication with said pair of chambers for passing said pressure therethrough as said first conical element is moved out of sealing engagement with the first conical seat and the thin peripheral edge is flexed out of sealing engagement with the casing by said fluid pressure entering the casing at said one end thereof, a second conical seat formed in said casing, a second conical element at the other end of said body portion normally maintained out of sealing engagement with said second conical seat by said spring, said second conical element being movable into sealing engagement with said second conical seat as the first conical element is moved out of sealing engagement with said first conical seat and the thin peripheral edge is flexed out of sealing engagement with the casing by said fluid pressure entering the casing at said one end thereof, said second conical element being movable out of engagement with said second conical seat in response to return pressure entering the casing at the other end thereof and in reverse direction, said return pressure forcing said first conical element in sealing engagement with said first conical seat and the thin peripheral edge in sealing engagement with the casing, and an exhaust port in said casing and disposed between said one end of the casing and the other end thereof in communication with said chambers and the atmosphere for exhausting the return pressure from the casing when the second conical element is unsealed from the second conical seat, the first conical element is in sealing engagement with the first conical seat, and the thin peripheral skirt is in sealing engagement with the casing.

2. A valve for passing and exhausting pressurized fluid and comprising a casing having a first conical seat and a second conical seat disposed therein, a unitary valve member composed of pliable material disposed within said casing and having a cylindrical body, a working chamber at one end of the casing, a first conical element at one terminal end of the body and normally in sealing engagement with said first conical seat, a second conical element at the other terminal end of the body and normally out of engagement with said second conical seat, a spring in engagement with said second conical element and the casing for maintaining the first conical element in engagement with said first conical seat, an annular flexible skirt formed with the body and disposed between and in spaced relation with respect to the conical elements, a thin peripheral portion on the skirt of a larger diameter than the diameter of the body and normally in sealing engagement with the wall forming said working chamber, said skirt having a thick convex portion integral with the body and extending inwardly into the body a substantial distance for increasing the strength of the skirt at the flexing point thereof, a fluid receiving chamber at the other end of the casing, a plurality of ports disposed interiorly of the casing in communication with said working chamber and the receiving chamber for passing pressurized fluid through the casing when said second conical element is in engagement with said second conical seat, the first conical element is out of engagement with the first conical seat and said peripheral portion on the skirt is out of engagement with said wall forming the working chamber, and additional ports in the casing in communication with the working chamber, the atmosphere, the plurality of ports and the receiving chamber for exhausting pressurized fluid into the atmosphere when said second conical element is out of engagement with the second conical seat, the first conical element is in engagement with the first conical seat and the peripheral portion on the skirt is in engagement with said wall forming the working chamber.

3. A valve assembly comprising a casing, a unitary pressure responsive element composed of pliable material disposed within said casing, said valve element including a cylindrical body portion having a conical pressure sealing member at each end thereof movable by fluid pressure into and out of sealing engagement with said casing for controlling the passage of said fluid pressure therethrough in at least two directions, a flexible circular skirt disposed between the conical sealing members and of larger diameter than said cylindrical body portion, said skirt having a thin peripheral sealing edge normally in sealing engagement with the casing and movable into and out of sealing engagement therewith by said fluid pressure according to the position of the conical sealing members and the direction of flow of the fluid pressure, said sealing edge forming a part of a thickened convex portion integrally formed with the cylindrical body portion thereby to strengthen the skirt at the flexing point thereof, and spring means disposed within the casing in engagement with one of the conical members for normally maintaining the other conical member in sealing engagement with the casing.

References Cited in the file of this patent

UNITED STATES PATENTS

| | | |
|---|---|---|
| 259,682 | Gruber | June 20, 1882 |
| 1,506,012 | Lewis | Aug. 26, 1924 |
| 1,965,070 | Cumming | July 3, 1934 |
| 2,328,902 | Grove | Sept. 7, 1943 |
| 2,567,391 | Mead | Sept. 11, 1951 |
| 2,764,174 | Wilson | Sept. 25, 1956 |

FOREIGN PATENTS

| | | |
|---|---|---|
| 1,142,320 | France | Mar. 25, 1957 |